United States Patent Office 2,726,193
Patented Dec. 6, 1955

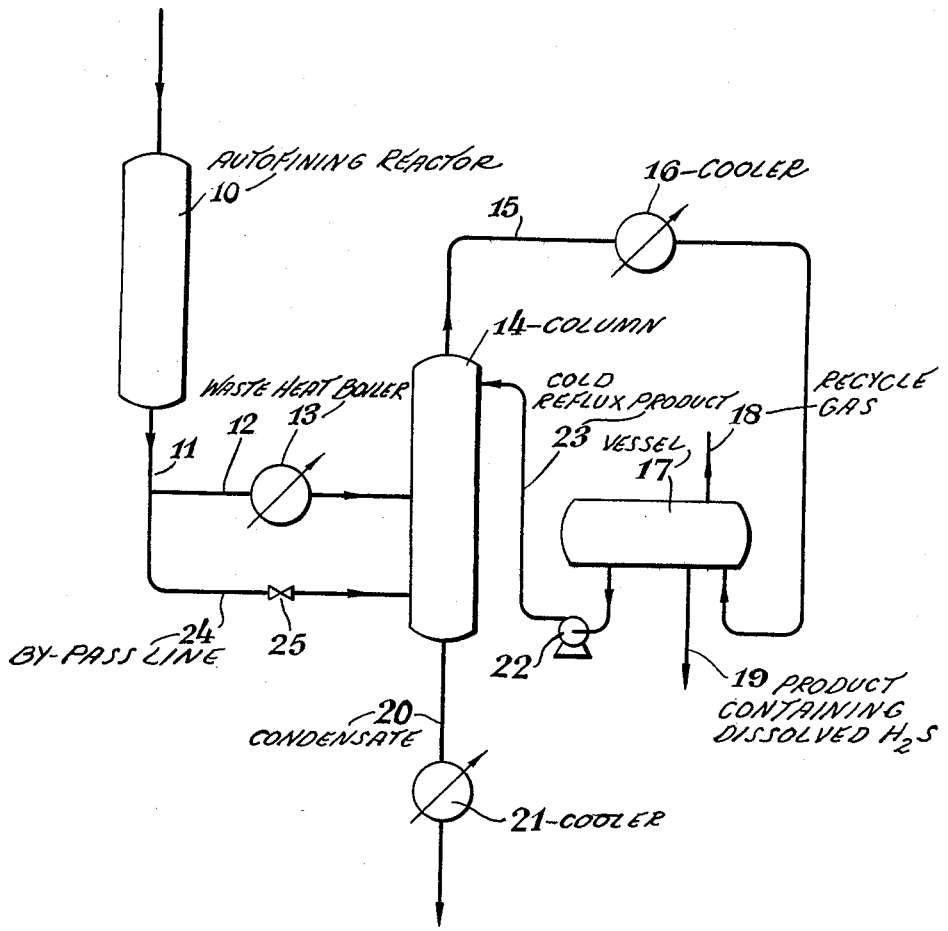
INVENTORS:
Patrick Docksey
Frederick William Bertram Porter
Hubert Thomas Porter

2,726,193

CATALYTIC DESULPHURISATION OF PETROLEUM HYDROCARBONS

Patrick Docksey, Frederick William Bertram Porter, and Hubert Thomas Porter, Sunbury-on-Thames, England, assignors to The British Petroleum Company Limited Application July 20, 1953, Serial No. 369,082

Claims priority, application Great Britain April 4, 1950

9 Claims. (Cl. 196—28)

This invention relates to the catalytic desulphurisation of petroleum hydrocarbons.

Among the processes which are known for the removal of organically combined sulphur from petroleum hydrocarbons is the so-called hydrofining process in which the petroleum hydrocarbons to be desulphurised are passed in admixture with hydrogen over a sulphur-resistant hydrogenation catalyst at elevated temperature and pressure whereby the organically combined sulphur is converted into hydrogen sulphide which may readily be removed from the treated hydrocarbons the properties of which are not otherwise appreciably affected. This process is technically effective for the removal of organically combined sulphur from petroleum hydrocarbons but is not commercially attractive in view of the cost of supplying the considerable quantity of hydrogen consumed in the process. It was also known that the hydroforming process produced hydrogen and at the same time effected a considerable degree of desulphurisation, but by its very nature this process is not applicable in cases where it is desired to desulphurise feedstocks, such as gas oils and aromatic extracts, without appreciably affecting the properties of the feedstock other than changes consequent upon the removal of the organically combined sulphur as hydrogen sulphide.

Desulphurisation processes are also known in which a substance capable of supplying hydrogen under the conditions of the desulphurisation reaction is added to the feedstock to be desulphurised, but this is only a special case of hydrofining and suffers from the disadvantage of the cost of supplying the hydrogen donor and from the additional disadvantage that the through-put of the feedstock is reduced by the addition of the considerable quantity of hydrogen donor necessary to supply sufficient hydrogen.

It was then discovered that by careful control of the temperature and pressure and by using a sufficiently active dehydrogenation-hydrogenation catalyst, it was possible to derive sufficient hydrogen by dehydrogenation of naphthenes contained in the feedstock to enable sufficient of the organically combined sulphur in the feedstock to be converted into hydrogen sulphide, under the same temperature and pressure conditions, to constitute an effective desulphurisation process. This process has been called "autofining" and it has the considerable advantage as compared with hydrofining that all the hydrogen required for desulphurisation is derived from the feedstock itself. It was surprising to find that conditions existed under which the two reactions of dehydrogenation of naphthenes and hydrogenation of organic sulphur compounds could proceed simultaneously to the extent necessary to provide a satisfactory catalytic desulphurisation process. The process was found to be applicable to a wide variety of feedstocks ranging from naphthas to wax distillates under the following set of conditions:

| | |
|---|---|
| Pressure | 50–200 p. s. i. g. |
| Temperature | 750–800° F. |
| Space velocity | 1.0–5.0 v./v./hr. |
| Recycle rate | 2000–4000 CF/B. |

The preferred catalyst for use in the autofining process is of the so-called cobalt molybdate type which comprises mixtures of the oxides of cobalt and molybdenum or chemical compounds of cobalt, molybdenum and oxygen, or mixtures of one or both of said oxides with said compounds either alone or incorporated with a support. It has been found that there is a period at the commencement of each run during which the gas make is negligible or non-existent and the desulphurisation is not at its maximum. This low dehydrogenating activity of the catalyst is more noticeable at low feedstock velocities and with the heavier feedstocks. It was discovered that the non-activity of the catalyst during the early hours on stream could be largely overcome by subjecting the catalyst to the action of hydrogen sulphide or hydrogen sulphide-containing gas prior to its use in the autofining process.

The regeneration of the used catalyst may be carried out by burning off the carbon and sulphur deposits with either a nitrogen/air or steam/air mixture. The following conditions may be employed for regeneration.

| | |
|---|---|
| Inlet temperature | 800–850° F. |
| Steam or nitrogen flow | 700–900 v./v./hr. |
| Air flow | 50–60 v./v./hr. |
| Inlet oxygen | 1 to 1.5% mol. |

The inlet oxygen concentration is controlled to keep the catalyst bed temperature below 1100° F. Regeneration restores the activity of the catalyst completely and it has been found that a large number of regenerations has no effect on the activity or properties of the catalyst.

The autofining process may be operated by setting the pressure in the autofining zone at a predetermined level and thereafter withdrawing from the system gas in excess of that required to maintain the predetermined pressure. In this case, there is a continuous make of hydrogen indicating that the hydrogen produced in the dehydrogenation reaction is not being fully utilised in the desulphurisation reaction. An improved method of operation was therefore developed in which the hydrogen-containing gaseous fraction is recycled to the reaction zone and the pressure therein allowed to rise to an equilibrium pressure at which the hydrogen evolved equals the hydrogen consumed. This method of operation results in a greater degree of desulphurisation and increased on-stream hours for a product of given sulphur content.

The autofining process may be carried out in a static bed reactor or by the use of the moving bed or fluid catalyst techniques.

Some feedstocks, such as blends containing $SO_2$ extracts, require redistillation after autofining to remove higher boiling components in order to obtain products of correct colour and final boiling point. The principal object of the present invention is to avoid the necessity of such redistillation of the products leaving an autofining system, thereby effecting a considerable saving in plant and utilities requirements, as the revapourisation of the product for redistillation is avoided.

According to the invention, the products leaving an autofining zone are cooled without reduction of pressure, whereby undesirable higher boiling components are liquefied, the liquefied components are separated from the gaseous components, and the gaseous components are further cooled without reduction of pressure and passed to a separator for the recovery of a liquid product and a recycle gas. The liquid product contains dissolved hydrogen sulphide which may be removed by reducing the pressure in the liquid product.

The separation of the liquefied components from the gaseous components is conveniently effected by passing the cooled products into a column in which the liquefied components collect and from which the gaseous components are removed. The temperature of the vapours entering the column may conveniently be controlled by means of a waste heat boiler. By adjusting the steam pressure, the temperature on the water side of the boiler, and hence the temperature of the vapours, may be kept steady at any desired figure. The vapours are cooled by the boiler until the required quantity of higher boiling components has been condensed out and collected in the column.

If a greater degree of fractionation is required than can be produced by use of a waste heat boiler, the column may be equipped with bubble trays, or packed as a fractionation tower, and the vapours passing up the column partially condensed by the cold product pumped in as reflux at the top of the column.

Furthermore, some of the vapours from the autofining zone may be caused to by-pass the waste heat boiler and to enter at the base of the column to strip the bottoms descending the column.

The invention will now be described by way of example with reference to the accompanying diagrammatic drawing.

Vapours leave the autofining reactor 10 via line 11 at a temperature of 780° F. and a pressure of 100 p. s. i. g., and pass via line 12 into a waste heat boiler 13 where they are cooled without reduction of pressure and thence pass into a column 14. The vapours leaving the column 14 overhead via line 15 are condensed and cooled in cooler 16, or alternatively heat exchanged with the feed, in each case without reduction of pressure, and pass to a vessel 17 from which a recycle gas is taken via line 18 and a product containing dissolved H2S via line 19. Condensate leaves the base of the column 14 via line 20 and cooler 21. The liquid product leaving the vessel 17 via line 19 is then let down to atmospheric pressure for the removal of dissolved H2S.

The column 14 may be equipped with bubble trays or packed as a fractionating tower, and cold product passed to the top of the column 14 as reflux via pump 22 and line 23.

Some of the vapours leaving the reactor 10 may be caused to by-pass the waste heat boiler 13 and to enter the base of the column 14 via line 24 and valve 25, said by-passed vapours passing up the column as a stripping medium.

The advantage of providing a column according to the present invention appears from the following example.

When a blend of kerosine, naphtha and SO2 kerosine extract intended for use as a tractor vapourising oil was autofined without the provision of a column according to the present invention, it was found that the colour of the product did not meet the specification +14 Saybolt without rerunning. The autofining plant was then equipped with a column and a waste heat boiler in accordance with the present invention, and vapours leaving the reactor at 780° F. were passed through the waste heat boiler and entered the column at about 440° F. The overhead product from the column had a Saybolt colour of +21, while the bottoms product of less than zero Saybolt amounted to only 5% of the feed.

The following are typical results obtained when autofining tractor vapourising oil blends. In those cases where there was no by-pass of hot vapours, the column was operated as a simple knock-back, i. e. no packing was used above the entry into the column. When vapours were by-passed into the bottom of the column, 4 ft. of packing was used in the stripping or bottom zone.

| Condition | 1 | 2 | 3 | 4 |
|---|---|---|---|---|
| Column Outlet Temperature, ° F | 426 | 438 | 436 | 438 |
| W. H. B. By-pass, percent vol. on feed | Nil | Nil | 8.7 | Nil |
| External Reflux, G. P. H | Nil | Nil | 3.4 | Nil |
| Column Residue, percent vol. on feed | 11.0 | 5.4 | 5.6 | 1.5 |
| Colour total feed to column, Lovibond 6" cell | 2.25 | 2.25 | 2.25 | 2.25 |
| Colour Overhead from column, Lovibond 18" cell | 1.0 | 1.5 | 1.5 | 2.25 |
| Colour Overhead, Saybolt | +25 | +21 | +21 | +16 |

On the autofining of SO2 kerosine extract, the following results were obtained:

| | 1 | 2 | 3 | 4 |
|---|---|---|---|---|
| Column Outlet Temperature, ° F | 442 | 437 | 436 | 433 |
| W. H. B. By-pass, percent vol. on feed | Nil | 16 | 12 | 14 |
| External Reflux, G. P. H | Nil | 12 | Nil | Nil |
| Entry Above or Below Packing | Above | Above | Below | Below |
| Column Residue, percent vol. on feed | 1.3 | 4.6 | 5.1 | 10.1 |
| Colour total feed to Column, Lovibond 6" cell | 2.75 | 3.5 | 3.5 | 3.5 |
| Colour Overhead from column, Lovibond 18" cell | 3.25 | 2.0 | 2.25 | 1.5 |
| Colour Overhead from column, Saybolt | +11 | +17 | +16 | +21 |

The present application is a continuation-in-part of our copending application No. 217,598 filed March 26, 1951.

We claim:

1. A process for the catalytic desulphurisation of petroleum hydrocarbons which comprises passing a petroleum feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge which are correlated so that the dehydrogenation of naphthenes contained in the feedstock is effected to an extent not substantially in excess of that required to provide sufficient hydrogen to convert organically combined sulphur contained in the feedstock into hydrogen sulphide and to maintain the pressure in the reaction zone, cooling the vaporous products leaving the reaction zone without reduction of pressure to a temperature in a first stage at which only the undesirable higher boiling components are liquefied, separating said liquefied undesirable components from the gaseous components, further cooling said gaseous components in a second stage without reduction of pressure for the recovery of a hydrogen-rich gas and a liquid product containing dissolved H2S, recycling said hydrogen-rich gas to the reaction zone so as to constitute the whole of the hydrogen supplied to said zone and to maintain the pressure therein, and reducing the pressure on said liquid product for the separation of the dissolved H2S and the recovery of a desulphurised liquid product.

2. A process for the catalytic desulphurisation of petroleum hydrocarbons which comprises passing a petroleum feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge, which are correlated so that the dehydrogenation of naphthenes contained in the feedstock is effected to an extent not substantially in excess of that required to provide sufficient hydrogen to convert organically combined sulphur contained in the feedstock into hydrogen sulphide and to maintain the pressure in the reaction zone, cooling the vaporous products leaving the reaction zone without reduction of pressure to a temperature in a first stage at which only the undesirable higher boiling components are liquefied, passing the cooled products into a column wherein the liquefied undesirable components are separated from the gaseous components, further cooling said gaseous components in a second stage without reduction of pressure for the recovery of a hydrogen-rich gas and a liquid product containing dissolved H₂S, recycling said hydrogen-rich gas to the reaction zone so as to constitute the whole of the hydrogen supplied to said zone and to maintain the pressure therein, and reducing the pressure on said liquid product for the separation of the dissolved H₂S and the recovery of a desulphurised liquid product.

3. A process for the catalytic desulphurisation of petroleum hydrocarbons which comprises passing a petroleum feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge which are correlated so that the dehydrogenation of naphthenes contained in the feedstock is effected to an extent not substantially in excess of that required to provide sufficient hydrogen to convert organically combined sulphur contained in the feedstock into hydrogen sulphide and to maintain the pressure in the reaction zone, cooling the vaporous products leaving the reaction zone without reduction of pressure by means of a waste heat boiler to a temperature in a first stage of which only the undesirable higher boiling components are liquefied, passing the cooled products into a column wherein the liquefied components are separated from the gaseous components, further cooling said gaseous components in a second stage without reduction of pressure for the recovery of hydrogen-rich gas and a liquid product containing dissolved H₂S, recycling said hydrogen-rich gas to the reaction zone so as to constitute the whole of the hydrogen supplied to said zone and to maintain the pressure therein, and reducing the pressure on said liquid product for the separation of the dissolved hydrogen sulphide and the recovery of a desulphurised liquid product.

4. A process for the catalytic desulphurisation of petroleum hydrocarbons which comprises passing a petroleum feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge which are correlated so that the dehydrogenation of naphthenes contained in the feedstock is effected to an extent not substantially in excess of that required to provide sufficient hydrogen to convert organically combined sulphur contained in the feedstock into hydrogen sulphide and to maintain the pressure in the reaction zone, cooling the vaporous products leaving the reaction zone without reduction of pressure to a temperature in a first stage at which only the undesirable higher boiling components are liquefied, passing the cooled products into a fractionating tower wherein the liquefied components are separated from the gaseous components, further cooling said gaseous components in a second stage without reduction of pressure for the recovery of a hydrogen-rich gas and a liquid product containing dissolved H₂S, recycling said hydrogen-rich gas to the reaction zone so as to constitute the whole of the hydrogen supplied to said zone and to maintain the pressure therein, returning part of said liquid product as reflux to the top of the fractionating tower, and reducing the pressure on the remainder of said liquid product for the separation of the dissolved hydrogen sulphide and the recovery of a desulphurised liquid product.

5. A process for the catalytic desulphurisation of petroleum hydrocarbons which comprises passing a petroleum feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge which are correlated so that the dehydrogenation of naphthenes contained in the feedstock is effected to an extent not substantially in excess of that required to provide sufficient hydrogen to convert organically combined sulphur contained in the feedstock into hydrogen sulphide and to maintain the pressure in the reaction zone, cooling the bulk of the vaporous products leaving the reaction zone without reduction of pressure to a temperature in a first stage at which only the undesirable higher boiling components are liquefied, passing the cooled products into a fractionating tower wherein the liquefied components are separated from the gaseous components, passing the remainder of the vaporous products from the reaction zone to the base of the fractionating tower, further cooling the gaseous components recovered from the fractionating tower in a second stage without reduction of pressure for the recovery of a hydrogen-rich gas and a liquid product containing dissolved H₂S, recycling said hydrogen-rich gas to the reaction zone so as to constitute the whole of the hydrogen supplied to said zone and to maintain the pressure therein, returning part of said liquid product as reflux to the top of the fractionating tower, and reducing the pressure in the remainder of said liquid product for the separation of the dissolved hydrogen sulphide and the recovery of a desulphurised liquid product.

6. A process according to claim 1, wherein said catalyst is of the cobalt molybdate type.

7. A process for the hydrocatalytic desulphurization of sulphur-naphthene-containing petroleum feedstocks which, after desulphurization, normally require redistiliation to remove undesirable higher boiling components in order to obtain products of correct color and final boiling point, which process comprises passing the feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and at a pressure between about 50–200 p. s. i. gauge at which hydrogen is continuously evolved from said feedstock by dehydrogenation of naphthenes contained therein, for consumption in converting organically combined sulphur in the feedstock into hydrogen sulphide and for maintaining the pressure on the reaction zone, the hydrogen evolved being at least equal to the hydrogen consumed, cooling the vaporous products leaving the reaction zone without reduction of pressure to a temperature in a first stage, at which only the undesirable higher boiling components are liquefied, separating said liquefied undesirable components from the gaseous components, further cooling said gaseous components in a second stage without reduction of pressure for the recovery of a hydrogen-rich gas and a liquid product containing dissolved H₂S, recycling said hydrogen-rich gas to the reaction zone so as to constitute the whole of the hydrogen supplied to said zone and to maintain the pressure therein, and reducing the pressure on said liquid product for the separation of the dissolved H₂S and the recovery of a desulphurized liquid product.

8. The process of claim 7 in which the feedstock is a blend of kerosene, naphtha and SO₂ kerosene extract intended for use as a tractor vaporization oil.

9. A process for the hydrocatalytic desulphurization of sulphur-naphthene-containing petroleum feedstocks which, after desulphurization, normally require redistillation to remove undesirable higher boiling components in order to obtain products of correct color and final boiling point, which process comprises passing the feedstock to a reaction zone wherein the feedstock is contacted with hydrogen in the presence of a sulphur-resistant dehydrogenation-hydrogenation catalyst which is active both for the dehydrogenation of naphthenes to aromatics and for the conversion of organically combined sulphur into hydrogen sulphide, at an elevated temperature and elevated pressure at which hydrogen is continuously evolved from said feedstock by dehydrogenation of naphthenes contained therein, for consumption in converting organically combined sulphur in the feedstock into hydrogen sulphide and for maintaining the pressure in the reaction zone, said elevated pressure in said zone being allowed to rise to an equilibrium pressure at which the hydrogen evolved is at least equal to the hydrogen consumed, cooling the vaporous products leaving the reaction zone without reduction of pressure to a temperature in a first stage, at which only the undesirable higher boiling components are liquefied, separating said liquefied undesirable components from the gaseous components, further cooling said gaseous components in a second stage without reduction of pressure for the recovery of a hydrogen-rich gas and a liquid product containing dissolved H₂S, recycling said hydrogen-rich gas to the reaction zone so as to constitute the whole of the hydrogen supplied to said zone and to maintain the pressure therein, and reducing the pressure on said liquid product for the separation of the dissolved H₂S and the recovery of a desulphurized liquid product.

References Cited in the file of this patent

UNITED STATES PATENTS

| | | |
|---|---|---|
| 2,063,113 | Morrell | Dec. 8, 1936 |
| 2,567,252 | Strang | Sept. 11, 1951 |
| 2,574,445 | Porter et al. | Nov. 6, 1951 |
| 2,656,302 | Porter et al. | Oct. 20, 1953 |